D. S. KROHN.
MOTOR DRIVEN SLED.
APPLICATION FILED APR. 7, 1917.
1,243,612.
Patented Oct. 16, 1917.
3 SHEETS—SHEET 2.
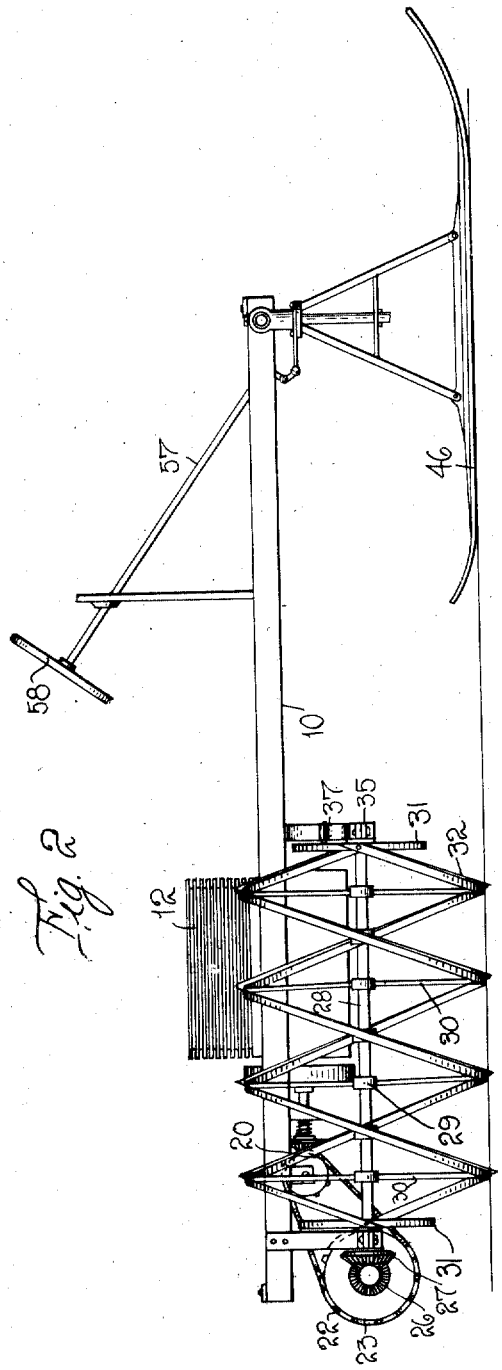
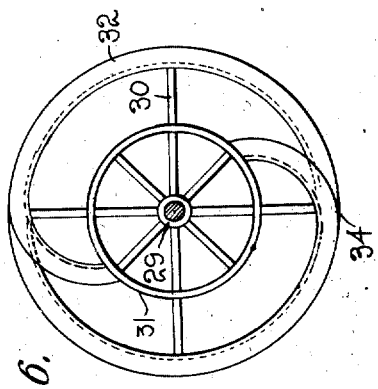
Inventor
DEWEY S. KROHN
By Watson E. Coleman
Attorney

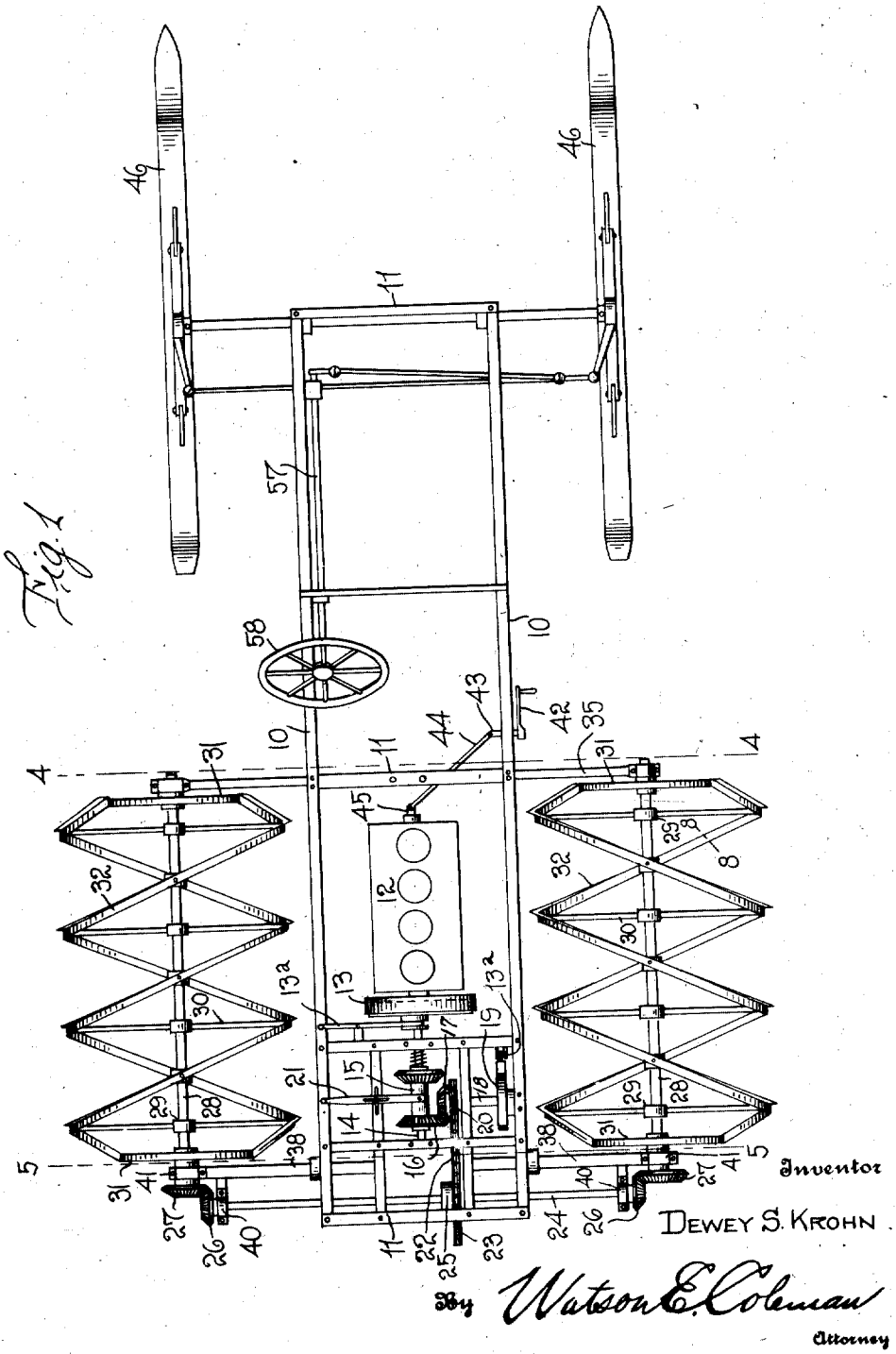

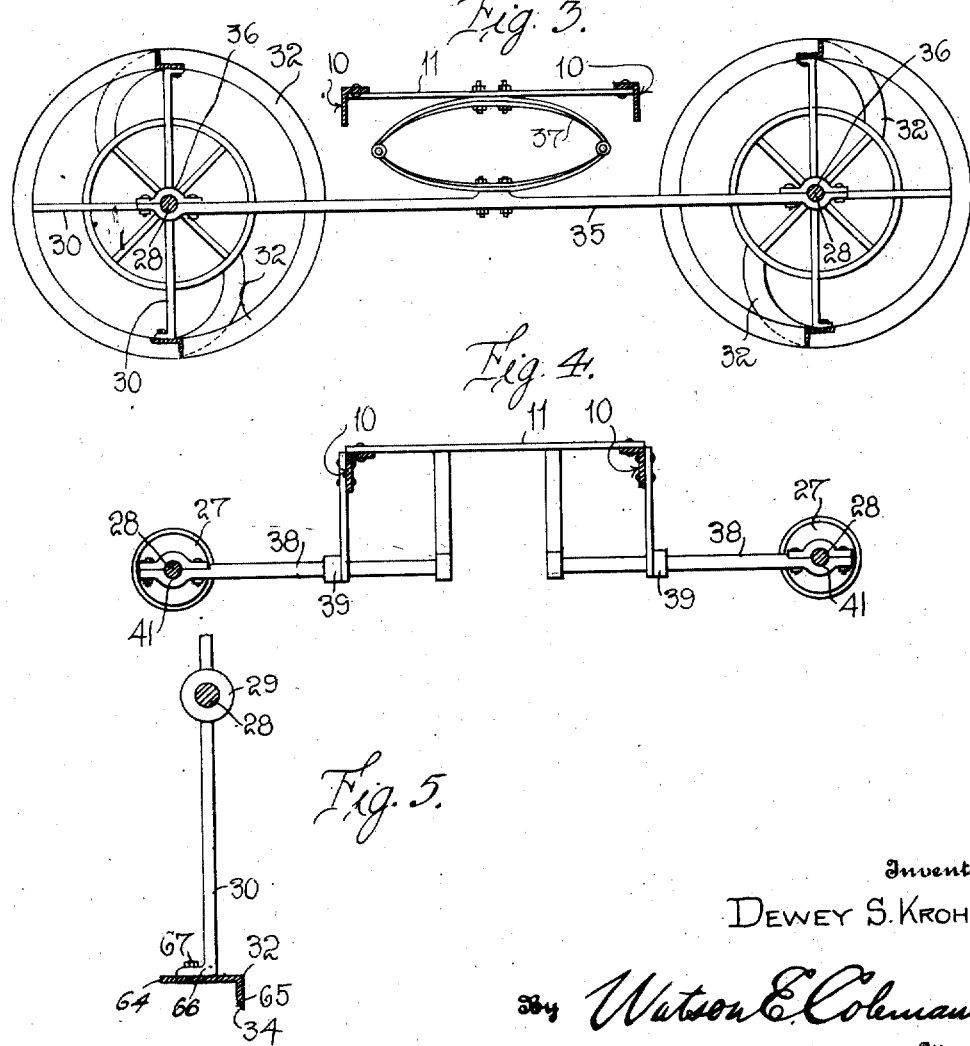

UNITED STATES PATENT OFFICE.

DEWEY S. KROHN, OF SIMPSON, MONTANA.

MOTOR-DRIVEN SLED.

1,243,612.   Specification of Letters Patent.   Patented Oct. 16, 1917.

Application filed April 7, 1917. Serial No. 160,434.

*To all whom it may concern:*

Be it known that I, DEWEY S. KROHN, a citizen of the United States, residing at Simpson, in the county of Hill and State of Montana, have invented certain new and useful Improvements in Motor-Driven Sleds, of which the following is a specification, reference being had to the accompanying drawings.

This invention relates to motor vehicles, and particularly to motor operated sleds or sleighs.

The general object of this invention is to provide a vehicle adapted to be driven over snow or ice by a motor mounted thereon and having drivers formed with helical blades designed to engage with the snow and force the vehicle forward or backward, as the case may be, said drivers being so mounted that the forward ends of the drivers may be yieldingly forced down into the snow to secure a good tractive effect thereon.

A further object is to provide improved means for driving the helical drivers from the motor.

Other objects will appear in the course of the following description.

My invention is illustrated in the accompanying drawings, in which:—

Figure 1 is a top plan view of a motor driven sled constructed in accordance with my invention;

Fig. 2 is a side elevation thereof;

Fig. 3 is a section on the line 4—4 of Fig. 1;

Fig. 4 is a section on the line 5—5 of Fig. 1;

Fig. 5 is a sectional view through one of the blades 32 and the shaft 28 showing a spoke and hub in elevation;

Fig. 6 is an end view of one of the drivers.

Referring to these drawings, it will be seen that my invention includes the longitudinally extending frame bars 10 connected at their forward and rear ends by the cross pieces 11 and intermediate their ends by any desired cross braces. The forward end of the machine is supported on runners, as will later appear, while the rear end of the machine is supported upon driving members which are operated by the motor. The motor, which is designated 12, may be of any suitable form but preferably is an internal combustion engine. It may be supported in any suitable manner upon the frame of the machine and is operatively connected through a clutch 13 to a driving shaft 14 mounted in any suitable bearings. Slidingly mounted upon this driving shaft 14 is a sleeve 15 carrying the oppositely disposed beveled gear wheels 16 which mesh with a beveled gear wheel 17 mounted upon a shaft 18. Also mounted upon this shaft 18 is a brake drum 19 and a sprocket wheel 20. The sleeve 15 is shiftable to bring either one of the beveled gears into mesh with the beveled gear wheel 17 by means of a lever 21. It will be obvious that when one of the beveled gears 16 is in mesh with the beveled wheel 17, the sprocket wheel 20 will be rotated in one direction and when the other beveled gear wheel is brought into action, the sprocket wheel 20 will be brought into the opposite direction. The power of the sprocket wheel 20 is transmitted by means of a sprocket chain 22 to a sprocket wheel 23 mounted upon a shaft 24, which extends transversely of the machine and is mounted, as will be later described. This shaft 24 is in two sections connected through a differential 25, in the usual manner, and on the ends of the shaft sections 24 there are mounted the beveled gear wheels 26, which mesh with beveled gear wheels 27 mounted upon longitudinally extending shafts 28, carrying the drivers now to be described.

Mounted upon the shaft 28 are a plurality of hubs 29 having radiating spokes 30. Also mounted upon each shaft 28, adjacent its forward and rear ends, are the disks 31. Mounted upon these disks and upon the spokes 30 are a plurality of helically arranged bars 32. These bars are angular in cross section and are attached to the spokes, as will be later stated. Preferably the outer edges of the bars are beveled, as at 34 (see Fig. 5). I have illustrated two of these bars 32 for each driver, but I do not wish to be limited to that number. It will be seen that these bars 32, being helically arranged, act as screws and that when the shafts 28 are rotated in one direction, the screws will drive the machine forward and when the shafts are rotated in the opposite direction, they will reverse the motion of the machine. The drivers are rotated in opposite directions relatively to each other and, therefore, the bars 34 are arranged reversely to each other on the opposite sides of the machine.

The foward ends of the shafts 28 are mounted in a transverse bar 35 having journal bearings 36 at its ends for the forward ends of the shafts 28 and this transverse bar 35 is urged downward by a heavy eliptical spring 37. This spring not only acts to yieldingly resist upward movement of the transverse bar 35, but also supports this bar. Thus the forward ends of the shafts 28 are free to move vertically. It is necessary, therefore, to support the rear ends of the shafts so that this vertical movement of the forward ends can be accomplished. To this end I mount upon the rear of the frame, the laterally projecting shafts 28, held in place by collars 39, and adapted to have a slight rotation in the supporting frame. These rock shafts 38 carry bearings 40 for the shaft sections 24 and also carry bearings 41 for the rear ends of the shafts 28. It will thus be seen that the beveled gear wheels 26 and 9 always be kept in proper relation but that both of the drivers are rotatably mounted at their rear ends through the medium of the shafts 38.

The operation of that portion of my invention so far described will be obvious to those skilled in the art. Through the medium of the clutch 13 and the clutch lever 13ª the motor may be thrown into or out of driving engagement with the shaft 14 and thus into driving engagement with the sleeve 15, which is keyed or otherwise attached upon the shaft and through the medium of this sleeve, the shafts 24 may be driven in one direction or the other, thus driving the machine either forward or rearward, as desired. While I have not shown any gearing for securing different driving speeds, it is obvious that such gearing may be used between the driving shaft and the shaft sections 24 in the same manner that they are used on an automobile. The engine is started, in any suitable manner, and I have shown for that purpose a starting crank 42 which is connected through a universal joint 43 to a shaft 44, in turn connected through a universal joint to a shaft section 45, in turn connected by a pawl and ratchet to the driving shaft of the motor. It is obvious that I do not wish to be limited to this construction, however, as a self starting system might be used for the purpose of starting the motor.

The forward end of the body of the vehicle may be supported in any suitable manner by means of runners 46 of any suitable construction, there being a pair of these runners and the runners being mounted for movement into horizontal plane by means of the steering shaft 57 having a wheel 58. I do not wish to be limited to any particular means for operating these steering runners.

While I do not wish to be limited to the particular formation of the bars 32, which form the drivers of the sleigh, I have illustrated in Fig. 5 the preferable form of these bars. These bars or blades as before stated, are angular in cross section so as to provide a base 64 which extends parallel to the axis of each driver and a flange 65, which extends perpendicular to the base 64. This flange 65 is sharpened at its edge so as to cut into the snow. Each spoke 30 is provided at its outer extremity with an angular head 66, which is attached to the base 64 by means of a bolt 67. The object of thus forming the bars 32 is that the base 64 acts to pack the snow for the flange 65 to take hold against as the base 64 is on the rear side of the flange 65. As before stated, this is a preferable form of the driving blades 32, as they may be termed.

It will be obvious that drivers constructed in accordance with my invention have a relatively large area of contact with the snow. One of the difficulties with motor sleds or sleighs has been to provide drivers which will engage the snow and exert sufficient tractive force to propel the vehicle. It is obvious that the width of the blades or bars 32 may be increased to any desired extent in order to secure this tractive force and that the drivers may be longer or shorter, as may be desired. It will further be seen that the base flanges 64 of the blades act to support the rear end of the sleigh and prevent its sinking too deeply into the snow, which it otherwise might do. It is obvious that runners might be provided on the rear end of the body for the same purpose. This self propelled sleigh or sled may be driven in exactly the same manner in which an automobile is driven and it will also be plain that the construction may be modified in many ways, without departing from the spirit of the invention. I do not wish to be limited to mounting the engine at the rear end of the machine and the driving shaft extended rearward and connected to the drivers in the manner heretofore described.

It will be seen that the spring 37 permits relatively great flexibility of the drivers over rough roads and this lessens strain on the drivers. This is particularly necessary where the machine is operating over rough roads and further it will be seen that the cross bar 35 may oscillate in a vertical plane so that one driver may lift or move downward, without affecting the other driver. This is also due to the fact that the shafts 38 have independent movement relatively to each other.

Having thus described my invention, what I claim is:—

1. A motor driven sled including a body, laterally disposed drivers having helically disposed blades, a motor mounted on the body, a driving shaft, a clutch between the motor and the driving shaft, a sleeve mounted on the driving shaft for longitudinal movement and carrying oppositely faced beveled gear wheels, a shaft extending at right angles to the sleeve and having a beveled gear wheel with which either one of the first named beveled gear wheels are adapted to engage, a transversely extending shaft operatively connected to the drivers to rotate them, and operative connections between the last named shaft and the shaft extending at right angles to the sleeve.

2. A motor driven sled including a body, laterally disposed longitudinally extending drivers having helically disposed blades, each driver being provided with an axially extending shaft, beveled gear wheels carried upon the rear end of each shaft, means operatively supporting the rear end of each shaft from the frame and permitting the shaft and driver to have movement in a vertical plane, a transverse shaft having beveled gear wheels engaging the beveled gear wheels on the driver shafts, means for transmitting power to the transverse shaft, and means yieldingly supporting the forward ends of the drivers from the frame.

3. A motor driven sled including a body having laterally disposed longitudinally extending driving shafts, a motor mounted on the body, drivers mounted on the shafts and having helical blades, a transversely extending supporting bar in which the forward ends of the shafts are mounted, a spring engaging the body of the sled and yieldingly supporting the bar, oppositely disposed transversely extending shafts in which the rear ends of the driver shafts are supported to permit the driver shafts to have movement in a horizontal plane, and a shaft supported on said last named shafts extending parallel thereto and operatively connected to the shafts of the drivers and to the motor.

In testimony whereof I hereunto affix my signature in the presence of two witnesses.

DEWEY S. KROHN.

Witnesses:
   B. M. WILLIAMS,
   O. A. KROHN.